(12) United States Patent
Murai et al.

(10) Patent No.: US 6,444,355 B1
(45) Date of Patent: *Sep. 3, 2002

(54) ADHESIVE FOR BATTERY, BATTERY USING THE SAME AND METHOD OF FABRICATING THE SAME

(75) Inventors: Michio Murai; Takayuki Inuzuka; Yasuhiro Yoshida; Kouji Hamano; Hisashi Shiota; Shigeru Aihara; Syo Shiraga, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 27 days.

This patent is subject to a terminal disclaimer.

(21) Appl. No.: 09/028,097

(22) Filed: Feb. 23, 1998

(30) Foreign Application Priority Data

Feb. 28, 1997 (JP) ............................. 9-045682
Nov. 13, 1997 (JP) ............................. 9-311989

(51) Int. Cl.[7] .......................... H01M 4/58; H01M 4/02; H01M 10/40

(52) U.S. Cl. .................... 429/144; 429/208; 429/249; 429/253; 429/254; 525/302; 525/304; 525/305; 525/309

(58) Field of Search ................... 429/144, 192, 429/194, 208, 249, 253, 254; 525/302, 304, 305, 309

(56) References Cited

U.S. PATENT DOCUMENTS

| | | | |
|---|---|---|---|
| 3,625,875 A | * 12/1971 | Frauenglass et al. | |
| 3,928,262 A | * 12/1975 | Ono et al. | 524/44 |
| 3,971,766 A | * 7/1976 | Ono et al. | 526/318.41 |
| 4,182,644 A | * 1/1980 | Briggs, Jr. et al. | |
| 4,293,665 A | * 10/1981 | Zalucha et al. | 525/255 |
| 4,381,386 A | * 4/1983 | Ritter et al. | |
| 4,612,288 A | * 9/1986 | Bigwood et al. | 435/180 |
| 4,798,773 A | * 1/1989 | Yasukawa et al. | 429/192 |
| 4,978,473 A | * 12/1990 | Kuroda et al. | 429/192 |
| 5,137,936 A | * 8/1992 | Akiguchi et al. | 522/170 |
| 5,212,622 A | * 5/1993 | MacFarlane et al. | 361/505 |
| 5,387,641 A | * 2/1995 | Yeung et al. | 524/557 |
| 5,437,692 A | 8/1995 | Dasgupta et al. | 29/623.2 |
| 5,456,000 A | 10/1995 | Gozdz et al. | 29/623.2 |
| 5,498,489 A | 3/1996 | Dasgupta et al. | 424/152 |
| 5,603,982 A | * 2/1997 | Sun | 429/192 |
| 5,605,548 A | * 2/1997 | Itou et al. | 429/192 |
| 5,641,590 A | * 6/1997 | Sato et al. | 429/192 |
| 5,824,748 A | * 10/1998 | Kesti et al. | |
| 5,883,208 A | * 3/1999 | Deviny | |
| 6,085,797 A | * 7/2000 | Grabaum et al. | 138/121 |
| 6,306,540 B1 | 10/2001 | Hiroi et al. | |
| 6,322,599 B1 | 11/2001 | Hamano et al. | |

* cited by examiner

Primary Examiner—Margaret Einsmann
(74) Attorney, Agent, or Firm—Oblon, Spivak, McClelland, Maier & Neustadt, P.C.

(57) ABSTRACT

A lithium ion battery comprising a positive electrode 1, a negative electrode 4 and a separator 7 for retaining an electrolyte, characterized in that as an adhesive 8 for bonding said positive electrode 1 to said separator 7 and said negative electrode 4 to said separator 7 there is used a thermosetting adhesive comprising a mixture of at least one organic vinyl compound containing two or more vinyl groups per molecule, a reaction catalyst and a volatile organic solvent.

15 Claims, 2 Drawing Sheets

ADHESIVE FOR BATTERY, BATTERY USING THE SAME AND METHOD OF FABRICATING THE SAME

BACKGROUND OF THE INVENTION

1. Field of the Invention

The present invention relates to a secondary battery for use in portable electronic apparatus, etc. More particularly, the present invention relates to a battery which can be in a thin form and an adhesive for use in the battery.

2. Description of the Related Art

There has been a very great demand for the reduction of the size and weight of portable electronic apparatus. The improvement of properties and the reduction of the size of batteries to be used therefor are indispensable for the accomplishment of these demands. To this end, the development of various batteries and the improvement of the properties of batteries are under way. Requirements for batteries are high voltage supply, high energy density, high reliability, arbitrariness of shape, etc. A lithium ion battery is a secondary battery which can be expected to realize the highest voltage and largest energy density in conventional batteries, and its improvement is still under way on an extensive scale.

A lithium ion battery comprises as essential elements a positive electrode plate, a negative electrode plate, and an ionically-conducting layer provided interposed therebetween. A lithium ion battery which has been put into practical use comprises as a positive electrode one obtained by applying a powder of lithium cobalt oxide or the like as an active material to a collector, and then forming the coated material into a plate and as a negative electrode one obtained by applying a powdered carbon-based material as an active material to a collector, and then forming the coated material into a plate. As the ionically-conducting layer there is used a porous film of polyethylene or polypropylene impregnated with a nonaqueous electrolyte which acts as a separator interposed between the positive electrode and the negative electrode.

In the conventional lithium ion batteries, it is necessary that all the surfaces of the positive electrode, the separator and the negative electrode are kept in contact with each other under an external pressure given by a rigid casing made of a metal or the like to keep these elements in electrical contact with each other as disclosed in JP-A-8-83608 (The term "JP-A" as used herein means an "unexamined published Japanese patent application").

Further, JP-A-5-159802 for secondary solid battery discloses a production process which comprises binding an electrolyte layer to an electrode material layer with a thermoplastic resin binder under heating to integrate the battery elements in one. In this case, the integration of the electrode and the electrolyte makes it possible to maintain electrical contact therebetween, eliminating the necessity of applying an external pressure to the battery when it works properly.

As a thin film battery there is known one comprising as an ionically-conducting material a polymer gel as described in U.S. Pat. No. 5,460,904. In this thin film battery, a copolymer of polyvinylidene fluoride and hexafluoropropylene is used as a polymer gel to integrate the positive electrode and the negative electrode in one.

The conventional battery described in JP-A-8-83608 is disadvantageous in that a rigid casing made of a metal or the like which can withstand an external pressure must be used to keep the electrode layer and the electrolyte layer in full electrical contact with each other. As a result, the casing, which is a portion other than the power-generating portion, accounts for a large portion of the battery in volume and weight, making it difficult to form a battery having a large energy density.

Further, the secondary solid battery disclosed in JP-A-5-159802 employs a solid binder to cover the electrode-electrolyte interface and thus is disadvantageous as compared with the foregoing type of a battery comprising a liquid electrolyte in a casing which can withstand an external pressure from the standpoint of the electrical conductivity of the electrode-electrolyte interface. If any used, no binders having an electrical conductivity equal to or higher than that of the liquid electrolyte have been generally found, making it impossible to provide an ionic conductivity equal to that of the battery comprising a liquid electrolyte.

Moreover, the thin film battery comprising a polyvinylidene fluoride disclosed in U.S. Pat. No. 5,460,904 is disadvantageous in that since the polyvinylidene fluoride copolymer is thermoplastic, its adhesive strength can be easily affected by temperature. In particular, at high temperatures, the polyvinylidene fluoride copolymer shows a drop of adhesive strength that causes peeling between the electrode and the separator, making it possible to accomplish the desired battery properties. The foregoing thin film battery is also disadvantageous in that it requires a complicated process. For example, the polyvinylidene fluoride copolymer ionically conductive must previously comprise a plasticizer incorporated therein to render itself ionically conductive. The copolymer is then formed into a predetermined shape. The plasticizer is then extracted with an organic solvent.

SUMMARY OF THE INVENTION

The present invention has been worked out to eliminate the foregoing problems. An object of the present invention is to provide an adhesive for battery which can easily form an electrode body having a good electrical contact between an electrode and an electrolyte within a wide temperature range free of rigid casing capable of withstanding an external pressure by connecting an electrode layer to an electrolyte layer, a battery formed by such an adhesive for battery, and a process for the production of such a battery.

The present invention relates to an adhesive for battery for adhering an electrode to a separator, characterized in that said adhesive contains at least one organic vinyl compound having two or more vinyl groups per molecule and comprises a a volatile organic solvent.

A first aspect of the adhesive for battery used for adhering an electrode to a separator of the present invention is an adhesive, which contains at least one organic vinyl compound having two or more vinyl groups per molecule and a volatile organic solvent.

A second aspect of the adhesive is an adhesive according to the first aspect, which further contains a reaction catalyst.

A third aspect of the adhesive is an adhesive according to the second aspect, which further contains a thermoplastic resin.

A fourth aspect of the adhesive is an adhesive according to the first aspect, wherein said organic vinyl compound having two or more vinyl groups per molecule is selected from the group consisting of an acrylic ester and methacrylic ester.

A fifth aspect of the adhesive is an adhesive according to the fourth aspect, which comprises in addition to said organic vinyl compound having two or more vinyl groups per molecule at least one organic vinyl compound containing one vinyl group per molecule.

A sixth aspect of the adhesive is an adhesive according to the third aspect, wherein said thermoplastic resin comprises at least one of a polyacrylic ester and polymethacrylic ester.

A seventh aspect of the battery of the present invention is a battery, which comprises an electrode laminate having:

a positive electrode;

a negative electrode;

a separator which is arranged between said positive electrode and negative electrode and keeps an electrolytic solution; and an adhesive resin layer which bonds said positive electrode and said negative electrode to said separator, wherein said adhesive resin layer contains at least one organic vinyl compound having at least two vinyl groups per molecule and a volatile organic solvent.

A eighth aspect of the battery is a battery according to the seventh aspect, wherein each of said positive electrode and negative electrode comprises a collector and an electrode active material layer formed on the collector, and adhesive strength between the active material layer and the separator is not smaller than that between the active material layer and the collector.

A ninth aspect of the battery is a battery according to the seventh aspect, wherein said battery has a plurality of electrode laminates.

A tenth aspect of the battery is a battery according to the ninth aspect, wherein said plurality of electrode laminates are arranged by alternately interposing positive electrodes and negative electrodes between a plurality of cut separators one by one.

An eleventh aspect of the battery is a battery according to the ninth aspect, wherein said plurality of electrode laminates are arranged by alternately interposing positive electrodes and negative electrodes between the gap of a wound separator one by one.

A twelfth aspect of the battery is a battery according to the ninth aspect, wherein said plurality of electrode laminates are arranged by alternately interposing positive electrodes and negative electrodes between the gap of a pair of folded separators.

A thirteenth aspect of the method of fabricating a battery is a method of present invention, which comprises the steps of:

coating an adhesive contains at least one organic vinyl compound having at least two vinyl groups per molecule and a volatile organic solvent on at least one of a separator and each of negative and positive electrodes to be adhered each other;

laminating a positive electrode and a negative electrode on the both surfaces of the separator respectively to form a electrode laminate;

curing the adhesive by heating the electrode laminate so that said volatile organic solvent is evaporated off said adhesive.

A fourteenth aspect of the method is a method according to the thirteenth aspect, wherein said adhesive further contains a catalyst.

A fifteenth aspect of the method is a method according to the thirteenth aspect, wherein, wherein said adhesive further contains a thermoplastic resin.

PREFERRED EMBODIMENTS OF THE INVENTION

Figure 1:
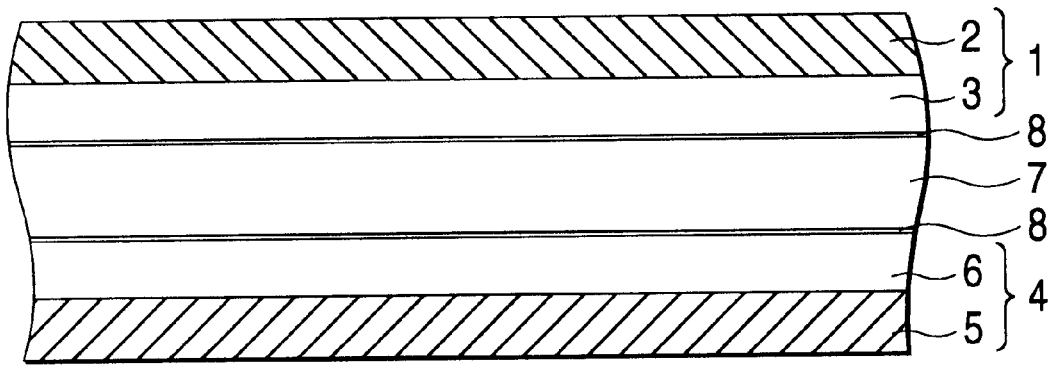
FIG. 1 is a sectional view of main part of battery illustrating an embodiment of the battery according to the present invention.

The inventors made extensive studies of preferred method of bonding the electrolyte layer (separator) to the electrode. As a result, the present invention has been worked out.

In other words, the present invention concerns an adhesive 8 for bonding a positive electrode 1 to a separator 7 and a negative electrode 4 to a separator 7 in the production of a battery comprising a positive electrode 1 having an active positive electrode material layer 3 bonded to a positive electrode collector 2, a negative electrode 4 having an active negative electrode material layer 6 bonded to a negative electrode collector 5, and a separator 7 for retaining an electrolyte as shown in FIGS. 1 to 4.

Figure 2:
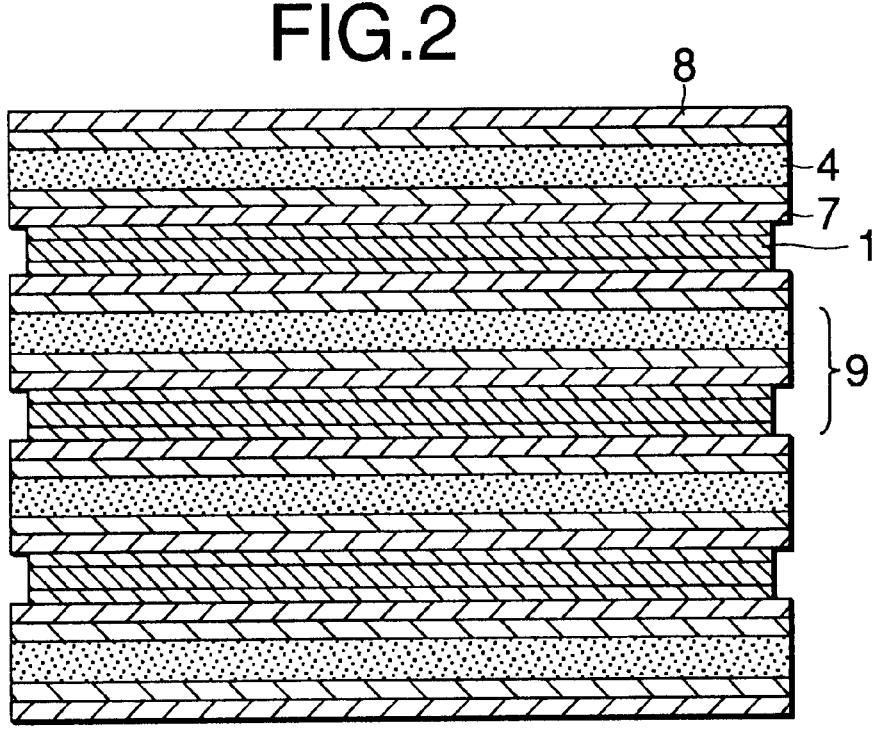
FIG. 2 is a sectional view of main part of battery illustrating another embodiment of the battery according to the present invention.
Figure 3:
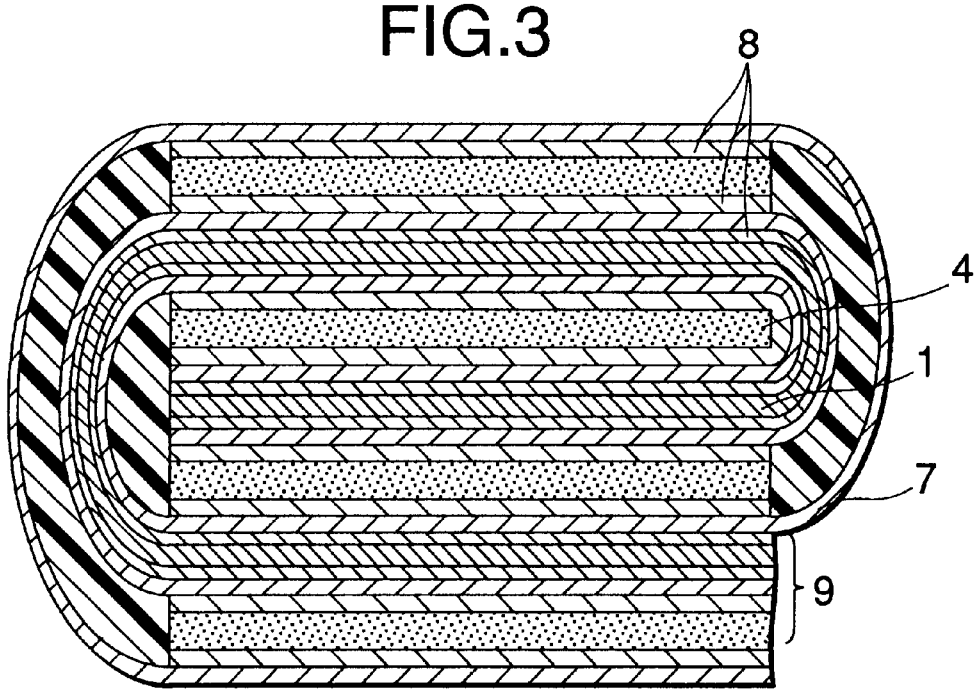
FIG. 3 is a sectional view of main part of battery illustrating a further embodiment of the battery according to the present invention.
Figure 4:
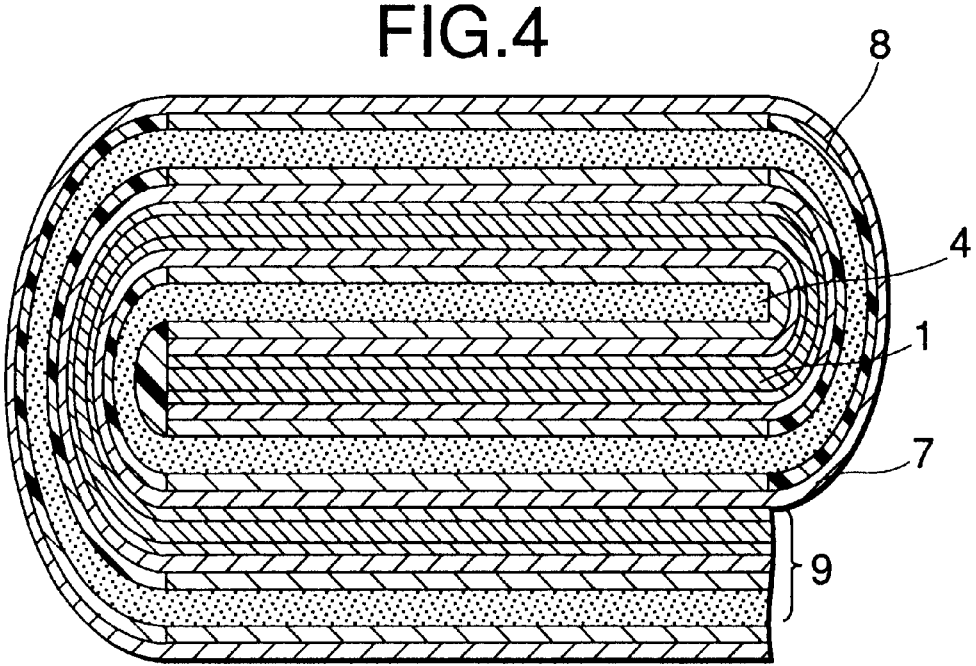
FIG. 4 is a sectional view of main part of battery illustrating a further embodiment of the battery according to the present invention.

FIG. 1 illustrates a battery comprising an electrode laminate 9 having a pair of electrodes 1, 4 made of active material layers 3, 6 bonded to collectors 2, 5, respectively, said pair of electrodes 1, 4 being bonded to a separator 7 on the active material layer sides 3, 6 thereof, respectively. FIGS. 2 to 4 each illustrate a battery comprising a plurality of the foregoing electrode laminates 9. In some detail, FIG. 2 illustrates a plurality of electrode laminates 9 formed by alternately arranging a positive electrode 1 and a negative electrode 4 between separated separators 7. FIGS. 3 and 4 each illustrate a plurality of electrode laminates 9 formed by alternately arranging a positive electrode 1 and a negative electrode 4 between the gap of a wound separator 7. Though not shown, the plurality of electrode laminates may be formed by alternately arranging a positive electrode and a negative electrode between the gap of a folded separator. The arrangement of such a plurality of electrode laminates 9 makes it possible to provide a battery capacity in proportion to the number of the electrode laminates despite compact shape.

The present invention is characterized by the composition of the adhesive 8 for bonding the electrodes 1, 4 to the separator 7. In other words, the adhesive 8 comprises an organic vinyl compound containing two or more vinyl groups per molecule, a reaction catalyst, and a volatile organic solvent. The production process of the present invention involves thermosetting of the adhesive 8.

The inventors made extensive studies of how to provide a secondary battery with a high reliability for small thickness and raise its charge-discharge efficiency within a wide temperature range. As a result, it was found that the use of an adhesive comprising an organic vinyl compound containing two or more vinyl groups per molecule, a reaction catalyst, and a volatile organic solvent makes it easy to produce a secondary battery having a secured reliability for small thickness and an excellent charge-discharge efficiency within a wide temperature range. Thus, the present invention has been worked out.

In accordance with the inventors' studies, an adhesive comprising an organic vinyl compound containing two or more vinyl groups per molecule, a reaction catalyst, and a volatile organic solvent as an adhesive 8 is applied to the surface of active materials 3, 6 or a separator 7. The active material layers 3, 6 are laminated on the separator 7. When the laminate is then heated, the organic vinyl compound containing two or more vinyl groups undergoes crosslinked polymerization upon forming a porous structure to cure while the volatile organic solvent being evaporated off the adhesive. Therefore adhesive 8 become porous and have good adhesion and good heat resistance. As above it can therefore be presumed that the adhesive exhibits an adhesive strength large enough to integrate the battery elements in one within a wide temperature range.

Further, in accordance with the inventors' studies, it was found that when a thermoplastic resin is added to the adhesive 8, a greater adhesive strength can be exerted. The reason for this phenomenon is unknown. However, it can be presumed that when an adhesive comprising an organic vinyl compound containing two or more vinyl groups per molecule, a reaction catalyst, and a volatile organic solvent is mixed with a thermoplastic resin, the mixture exhibits a raised viscosity that gives good wetting properties with respect to the electrodes 1, 5 and the separator 7. Further, the incorporation of the thermoplastic resin provides an adhesive with a raised viscosity that accelerates the curing thereof.

As the organic vinyl compound containing two or more vinyl groups per molecule there may be used a compound such as divinylbenzene, ethylene glycol dimethacrylate, triethylene glycol dimethacrylate, 1, 3-butylene glycol dimethacrylate, 1, 6-hexanediol dimethacrylate, polyethylene glycol dimethacrylate, polybutylene glycol dimethacrylate and trimethylolpropane trimethacrylate or a mixture thereof.

Among the foregoing organic vinyl compounds containing two or more vinyl groups per molecule, at least one acrylic ester or methacrylic ester is preferably used from the standpoint of availability and ease of handling.

Examples of the foregoing reaction catalyst include azobisisobutyronitrile, benzoyl peroxide, and lauroyl peroxide.

As the foregoing volatile organic solvent there may be used a compound such as N-methylpyrrolidone, propylene carbonate, ethylene carbonate, tetrahydrofuran, 1, 3-dioxolan, diethyl carbonate, dimethyl carbonate, sulfolane, tert-butylether, iso-butylether, 1, 2-dimethoxyethane, 1, 2-ethoxymethoxyethane, acetone, methyl ethyl ketone, ethyl acetate, acetonitrile, diethylether, dimethylformamide and dimethyl sulfoxide or a mixture thereof.

Alternatively, the foregoing organic vinyl compound containing two or more vinyl groups per molecule may be mixed and copolymerized with an organic vinyl compound containing only one vinyl group per molecule before used for bonding.

As the foregoing organic vinyl compound containing only one vinyl group per molecule there may be used a compound such as methyl methacrylate (MMA), ethyl methacrylate, n-butyl methacrylate, i-butyl methacrylate, t-butyl methacrylate, 2-ethylhexyl methacrylate, cyclohexyl methacrylate, benzyl methacrylate, isobornyl methacrylate, tetrahydrofurfuryl methacrylate, styrene, vinyl chloride and acrylonitrile or a mixture thereof.

[Embodiment]

The present invention will be further described in the following embodiments and comparative embodiments, but the present invention should not be construed as being limited thereto. The batteries of Embodiments 1 to 24 and Comparative Embodiments 1 to 3 each have an essential structure as shown in FIG. 1. These batteries were each in a film-like form (size: 50 mm×50 mm ×0.4 mm). These batteries were then measured for charge-discharge properties. The results of the measurement are set forth in Table 1 with the composition of the adhesives used in the embodiments and comparative embodiments.

The charge-discharge properties were measured by a method described in "Denchi Binran (Handbook of Battery)", edited by Editorial Committee of Handbook of Battery, Maruzen, 1990, under the following conditions.

Charging: constant current+constant voltage process; upper limit of voltage: 4.2 V Discharging: constant current process; lower limit of voltage: 2.5 V Current: 33.3 mA Charge-discharge efficiency=Discharged electrical capacity÷Charged electrical capacity Temperature conditions:
Measurement condition 1: measured at 25° C.
Measurement condition 2: measured at 60° C.
Measurement condition 3: The battery is subjected to cycle of 8 hour heating at 70° C.—8 hour cooling at 20° C. three times before measurement at 25° C.

TABLE 1-1

| | Composition of adhesive | | | | | | Battery charge-discharge properties | | |
| --- | --- | --- | --- | --- | --- | --- | --- | --- | --- |
| Embodiment No. | HMA | EGDM | HDDM | TMPTMA | PMMA | NMP | Measurement condition 1 | Measurement condition 2 | Measurement condition 3 |
| Embodiment 1 | 75 | 25 | | | 400 | | ◯ | ◯ | ◯ |
| 2 | 50 | 50 | | | 400 | | ◯ | ◯ | ◯ |
| 3 | 25 | 75 | | | 400 | | ◯ | ◯ | ◯ |
| 4 | 0 | 100 | | | 400 | | ◯ | ◯ | ◯ |
| 5 | 75 | | 25 | | 400 | 50 | ◯ | ◯ | ◯ |
| 6 | | 50 | | | 400 | | ◯ | ◯ | ◯ |
| 7 | 25 | | 75 | | 400 | | ◯ | ◯ | ◯ |
| 8 | 0 | | 100 | | 400 | | ◯ | ◯ | ◯ |
| 9 | 75 | | | 25 | 400 | | ◯ | ◯ | ◯ |
| 10 | 50 | | | 50 | 400 | | ◯ | ◯ | ◯ |
| 11 | 25 | | | 75 | 400 | | ◯ | ◯ | ◯ |
| 12 | 0 | | | 100 | 400 | | ◯ | ◯ | ◯ |

Measurement conditions
1. Measured at 25° C.
2. Measured at 60° C.
3. The battery is subjected to cycle of 8 hour heating at 70° C.—8 hour cooling at 20° C. three times before measurement at 25° C.

<Preparation of Positive Electrode>

An active positive material paste comprising 87% by weight of $LiCoO_2$, 8% by weight of a graphite powder and 5% by weight of a polyvinylidene fluoride was prepared. The active positive material paste thus prepared was applied to a support to a thickness of 300 μm by a doctor blade coating method to form a thin active material layer. An aluminum net having a thickness of 30 μm as a positive electrode collector 2 was then placed on the thin active material layer. The active positive material paste was then applied to the aluminum net to a thickness of 300 μm by a doctor blade coating method. The coated material was then allowed to stand in a 60° C. dryer for 60 minutes so that it was half-dried to form a laminate. The laminate was then rolled to a thickness of 400 μm to prepare a positive electrode 1 comprising an active positive electrode material layer 3 laminated on a positive electrode collector 2. The positive electrode 1 thus prepared was dipped in an electrolyte, and then measured for adhesive strength between the active positive electrode material layer 3 and the positive electrode collector 2. The results were 20 gf/cm at 25° C. and 15 gf/cm at 70° C.

<Preparation of Negative Electrode>

An active negative material paste comprising 95% by weight of mesophase microbead carbon (available from OSAKA GAS CO., LTD.) and 5% by weight of a polyvinylidene fluoride was prepared. The active negative material paste thus prepared was applied to a support to a thickness of 300 μm by a doctor blade coating method to form a thin active material layer. A copper net having a thickness of 20 μm as a negative electrode collector 5 was then placed on the thin active material layer. The active negative material paste was then applied to the copper net to a thickness of 300 μm by a doctor blade coating method. The coated material was then allowed to stand in a 60° C. dryer for 60 minutes so that it was half-dried to form a laminate. The laminate was then rolled to a thickness of 400 μm to prepare a negative electrode 4 comprising an active negative electrode material layer 6 laminated on a negative electrode collector 5. The negative electrode 4 thus prepared was dipped in an electrolyte, and then measured for adhesive strength between the active negative electrode material layer 6 and the negative electrode collector 5. The results were 12 gf/cm at 25° C. and 7 gf/cm at 70° C.

<Preparation of Adhesive>

Ethylene glycol dimethacrylate (hereinafter referred to as "EGDM"), methyl methacrylate (hereinafter referred to as "MMA") and N-methylpyrrolidone (hereinafter referred to as "NMP") were mixed in a weight proportion as set forth in Table 1. Azobisisobutyronitrile was dissolved in the mixture in an amount of one molecule per 100 vinyl groups in the mixture to prepare an adhesive.

<Preparation of Battery>

The adhesive thus prepared was then applied to both sides of a separator 7 made of a porous polypropylene sheet (Cellguard #2400, available from Hoexst Inc.) having a size of 55 mm square. The positive electrode 1 and the negative electrode 4 were then allowed to come in close contact with the respective side of the separator 7 to form a laminate having a predetermined thickness. The laminate thus formed was then pressed at a temperature of 80° C. for 2 hours to obtain a battery structure. The battery structure thus obtained was inserted into an aluminum-laminated film bag. The battery structure was then impregnated with an electrolyte (Sol-Rite, available from Mitsubishi Chemical Corporation; electrolytic salt: $LiClO_4$; electrolytic solvent: mixture of ethylene carbonate and diethyl carbonate; electrolytic salt concentration: 1M) under reduced pressure. The aluminum-laminated film bag was heat-sealed to prepare a battery.

Embodiments 5–8

Batteries were prepared in the same manner as in Embodiments 1 to 4 except that the adhesives used in Embodiments 1 to 4 were replaced by those obtained by mixing 1,6-hexanediol dimethacrylate (hereinafter referred to as "HDDM"), MMA and NMP in a weight proportion as set forth in Table 1, and then dissolving azobisisobutyronitrile in the mixture in an amount of one molecule per 100 vinyl groups in the mixture.

Embodiments 9–12

Batteries were prepared in the same manner as in Embodiments 1 to 4 except that the adhesives used in Embodiments 1 to 4 were replaced by those obtained by mixing trimethylolpropane trimethacrylate (hereinafter referred to as "TMPTMA"), MMA and NMP in a weight proportion as set forth in Table 1, and then dissolving azobisisobutyronitrile in the mixture in an amount of one molecule per 100 vinyl groups in the mixture.

Embodiments 13–16

Batteries were prepared in the same manner as in Embodiments 1 to 4 except that the adhesives used in Embodiments 1 to 4 were replaced by those obtained by mixing EGDM, MMA, NMP and a poly(methyl methacrylate) (hereinafter referred to as "PMMA") having an average molecular weight of 9,960,000 in a weight proportion as set forth in Table 1, and then dissolving azobisisobutyronitrile in the mixture in an amount of one molecule per 100 vinyl groups in the mixture.

Embodiments 17–20

Batteries were prepared in the same manner as in Embodiments 1 to 4 except that the adhesives used in Embodiments 1 to 4 were replaced by those obtained by mixing HDDM, MMA, NMP and PMMA in a weight proportion as set forth in Table 1, and then dissolving azobisisobutyronitrile in the mixture in an amount of one molecule per 100 vinyl groups in the mixture.

Embodiments 21–24

Batteries were prepared in the same manner as in Embodiments 1 to 4 except that the adhesives used in Embodiments 1 to 4 were replaced by those obtained by mixing TMPTMA, MMA, NMP and PMMA in a weight proportion as set forth in Table 1, and then dissolving azobisisobutyronitrile in the mixture in an amount of one molecule per 100 vinyl groups in the mixture.

COMPARATIVE EXAMPLES 1–2

Batteries were prepared in the same manner as in Embodiments 1 to 4 except that the adhesives used in Embodiments 1 to 4 were replaced by those obtained by mixing MMA, NMP and PMMA in a weight proportion as set forth in Table 1, and then dissolving azobisisobutyronitrile in the mixture in an amount of one molecule per 100 vinyl groups in the mixture.

COMPARATIVE EXAMPLE 3

A battery and a bonded specimen were prepared in the same manner as in Examples 1 to 4 except that the adhesives used in Embodiments 1 to 4 were replaced by those obtained by mixing 100 parts by weight of styrene (hereinafter referred to as "ST"), 400 parts by weight of NMP and 5 parts by weight of azobisisobutyronitrile.

The batteries obtained in the foregoing embodiments and comparative examples were then subjected to 100 cycles of charge-discharge under the following three temperature conditions. The charge-discharge properties were judged according to the following criterion. The results are set forth in Table 1.

● : Charge-discharge efficiency at 100th cycle is not less than 90%

○ : Charge-discharge efficiency at 100th cycle is not less than 85%

Δ : Charge-discharge efficiency at 100th cycle is not less than 75% x : Charge-discharge efficiency at 100th cycle falls below 75% or is immeasurable due to peeling in the battery Embodiment 25

In the present embodiment, a battery having a flat laminated structure as shown in FIG. 2 was prepared from the same positive electrode and negative electrode as used in Embodiments 1 to 4 and the same adhesive as used in Embodiments 1 to 24.

<Preparation of Battery>

The adhesive 8 was applied to one side of each of two sheets belt-like separators 7 made of a polypropylene sheet (Cellguard #2400, available from Hoext Inc.) bound in a roll. The belt-like negative electrode 4 (or positive electrode) was then positioned interposed between the two sheets of the separators 7 in such an arrangement that the coated surface of the two sheets were opposed to each other to form a laminate. The laminate was then pressed under heating.

Subsequently, a predetermined size of a sheet was stamped out from the separator laminate having the negative electrode 4 (or positive electrode) provided interposed therebetween. The adhesive 8 was then applied to one side of the separator laminate thus stamped out. The coated laminate was then laminated with the positive electrode 1 (or negative electrode) on the coated side thereof. Further, the adhesive 8 was applied to one side of another separator stamped out in a predetermined size. The separator was then laminated with the foregoing laminate of two separator laminates on the coated side thereof. This procedure was then repeated to form a battery body having a plurality of electrode laminates 9. The battery body was then heated under pressure to prepare a battery structure having a flat laminated structure as shown in FIG. 2.

Embodiment 26

In the present embodiment, a battery having a flat wound laminated structure as shown in FIG. 3 was prepared from the same positive electrode and negative electrode as used in Embodiments 1 to 4 and the same adhesive as used in Embodiments 1 to 24.

<Preparation of Battery>

The adhesive 8 was applied to one side of each of two sheets of belt-like separators 7 made of a polypropylene sheet (Cellguard #2400, available from Hoext Inc.) bound in a roll. The belt-like positive electrode 1 (or negative electrode) was then positioned interposed between the two sheets of the separators 7 in such an arrangement that the coated surface of the two sheets were opposed to each other to form a laminate. The laminate was then pressed under heating.

Subsequently, the adhesive 8 was applied to one side of the belt-like separator laminate having the positive electrode 1 (or negative electrode) provided interposed therebetween. One end of the separator laminate was then folded back by a predetermined amount. The negative electrode 4 (or positive electrode) was then inserted into the gap of the folded separator. The resulting laminate was then passed through a laminator. Subsequently, the adhesive 8 was applied to the other side of the belt-like separator. Another sheet of the negative electrode 4 (or positive electrode) was laminated with the belt-like separator on the coated side thereof in a position corresponding to the negative electrode 4 (or positive electrode) inserted into the gap of the folded separator. The separator was then wound in an ellipsoidal form with another sheet of the negative electrode 4 (or positive electrode) being laminated thereon. This procedure was repeated to form a battery body having a plurality of electrode laminates 9. The battery body was heated under pressure to prepare a battery structure having a flat wound laminated structure as shown in FIG. 3.

Embodiment 27

In the present embodiment, a battery having a flat wound laminated structure as shown in FIG. 4 was prepared from the same positive electrode and the negative electrode as used in Embodiments 1 to 4 and the same adhesive solution as used in Embodiments 1 to 24. The battery differs from that of Embodiment 26 in that the positive electrode, the negative electrode and the separator are simultaneously wound.

<Preparation of Battery>

The belt-like positive electrode 1 (or negative electrode) was arranged interposed between two sheets of belt-like separators made of a porous polypropylene sheet (Cellguard #2400, available from Hoext Inc.) bound in a roll. On the other hand, the belt-like negative electrode 4 (or positive electrode) was positioned on the outer side of one of the two sheets of the separators 7 in such an arrangement that it protruded from the edge of the separator by a predetermined amount.

Subsequently, the adhesive 8 was applied to the inner side of the two sheets of the separators 7 and the outer side of the one of the two sheets of the separators on which the negative electrode 4 (or positive electrode) had been placed. The negative electrode 4 (or positive electrode), the two sheets of the separators 7 and the positive electrode 1 (or negative electrode) were then laminated. The laminate thus prepared was then passed through a laminator. Subsequently, the adhesive 8 was applied to the outer side of the other of the two sheets of the separators 7. The protruding negative electrode 4 (or positive electrode) was then folded around the laminate onto the adhesive-coated surface thereof. The separator laminate was then wound in an ellipsoidal form with the folded negative electrode 4 (or positive electrode) contained thereinside to form a battery body having a plurality of electrode laminates 9. The battery body was heated under pressure to prepare a battery structure having a flat wound laminated structure.

Embodiment 28

Embodiments 26 and 27 have been described with reference to a battery comprising a wound belt-like separator. However, a negative electrode (or positive electrode) may be laminated with a laminate of two sheets of belt-like separators having a belt-like positive electrode (or negative electrode) provided interposed therebetween while folding the laminate.

As mentioned above, in accordance with the invention of claims 1, 3 and 4, the use of a battery adhesive for bonding an active material layer bonded to a collector to a separator comprising a mixture of at least one organic vinyl compound containing two or more vinyl groups per molecule, a reaction catalyst and a volatile organic solvent makes it possible to provide a practical battery having a desired adhesivity between the electrode and the separator within a wide temperature range, good battery charge-discharge properties, a secured reliability within a wide temperature range for small thickness and a high charge-discharge efficiency.

In accordance with first to seventh aspect of the present invention, the use of a battery adhesive for bonding an active material layer bonded to a collector to a separator comprising a mixture of at least one organic vinyl compound containing two or more vinyl groups per molecule, a reaction catalyst, a volatile organic solvent and a thermoplastic resin makes it possible to provide a practical battery having a desired adhesivity between the electrode and the separator within a wide temperature range, good battery charge-discharge properties, a secured reliability within a wide temperature range for small thickness and a high charge-discharge efficiency.

In accordance with of the present the invention, the use of a battery adhesive according to any one of eighth to twelfth aspect makes it possible to provide a practical battery having a secured reliability within a wide temperature range for small thickness.

What is claimed is:

1. An adhesive for battery used for adhering an electrode to a separator, comprising a mixture of
   (1) at least one organic vinyl monomer having two or more vinyl groups per molecule,
   (2) a volatile organic solvent,
   (3) a reaction catalyst, selected from azobisisobutyronitrile, benzoyl peroxide and lauroyl peroxide,
   (4) a thermoplastic resin selected from the group consisting of polyacrylic esters and polymethacrylic esters, and
   (5) at least one organic vinyl monomer containing one vinyl group per molecule selected from the group consisting of methyl methacrylate, ethyl methacrylate, n-butyl methacrylate, i-butyl methacrylate, t-butyl methacrylate, 2-ethylhexyl methacrylate, cyclohexyl methacrylate, benzyl methacrylate, isobornyl methacrylate, tetrahydrofurfuryl methacrylate, styrene, vinyl chloride and acrylonitrile,
   wherein said adhesive has a property that it becomes porous when heated, whereby said at least one organic vinyl monomer having two or more vinyl groups per molecule undergoes crosslinked polymerization, and said volatile organic solvent is evaporated off, and wherein said thermoplastic resin is present in an adhesive-strength increasing amount.

2. The adhesive for battery as claimed in claim 1, wherein said organic vinyl compound having two or more vinyl groups per molecule is selected from the group consisting of an acrylic ester and methacrylic ester.

3. The adhesive for battery as claimed in claim 1, wherein the volatile organic solvent is at least one selected from the group consisting of N-methylpyrrolidone, propylene carbonate, ethylene carbonate, tetrahydrofuran, 1,3-dioxolan, diethyl carbonate, dimethyl carbonate, sulfolane, tert-butylether, iso-butylether, 1,2-dimethoxyethane, 1,2-ethoxymethoxyethane, acetone, methyl ethyl ketone, ethyl acetate, acetonitrile, diethylether, dimethylformamide and dimethyl sulfoxide.

4. The adhesive for battery as claimed in claim 3, wherein the volatile organic solvent is N-methylpyrrolidone.

5. The adhesive for battery as claimed in claim 1, wherein the reaction catalyst is azobisisobutyronitrile.

6. The adhesive for battery as claimed in claim 2, wherein the at least one organic vinyl monomer having two or more vinyl groups per molecule is ethylene glycol dimethacrylate or trimethylolpropane trimethacrylate.

7. The adhesive for battery as claimed in claim 1, wherein the thermoplastic resin is poly (methyl methacrylate).

8. The adhesive for battery as claimed in claim 1, wherein the volatile organic solvent is N-methylpyrrolidone, the reaction catalyst is azobisisobutyronitrile, the at least one organic vinyl monomer having two or more vinyl groups per molecule is ethylene glycol dimethacrylate or trimethylolpropane trimethacrylate, and the thermoplastic resin is poly (methyl methacrylate).

9. A battery comprising an electrode laminate having:
   a positive electrode;
   a negative electrode;
   a separator which is arranged between said positive electrode and negative electrode and keeps an electrolytic solution; and
   an adhesive resin layer which bonds said positive electrode and said negative electrode to said separator,
   wherein said adhesive resin layer is an adhesive according to claim 1.

10. The battery as claimed in claim 9, wherein each of said positive electrode and negative electrode comprises a collector and an electrode active material layer formed on the collector, and
    adhesive strength between the active material layer and the separator is not smaller than that between the active material layer and the collector.

11. The battery as claimed in claim 9, wherein said battery has a plurality of electrode laminates.

12. The battery as claimed in claim 11, wherein said plurality of electrode laminates are arranged by alternately interposing positive electrodes and negative electrodes between a plurality of cut separators one by one.

13. The battery as claimed in claim 11, wherein said plurality of electrode laminates are arranged by alternately interposing positive electrodes and negative electrodes between the gap of a wound separator one by one.

14. The battery as claimed in claim 11, wherein said plurality of electrode laminates are arranged by alternately interposing positive electrodes and negative electrodes between the gap of a pair of folded separators.

15. A method of fabricating a battery, comprising the steps of:
    coating an adhesive according to claim 1 on at least one of a separator and each of negative and positive electrodes to be adhered each other;
    laminating a positive electrode and a negative electrode on the both surfaces of the separator respectively to form a electrode laminate;
    curing the adhesive by heating the electrode laminate so that said volatile organic solvent is distilled off said adhesive.

* * * * *